US010943068B2

(12) United States Patent
Poon et al.

(10) Patent No.: US 10,943,068 B2
(45) Date of Patent: Mar. 9, 2021

(54) N-ARY RELATION PREDICTION OVER TEXT SPANS

(71) Applicant: Microsoft Technology Licensing, LLC, Redmond, WA (US)

(72) Inventors: Hoifung Poon, Bellevue, WA (US); Cliff Wong, Seattle, WA (US); Robin Jia, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 16/370,671

(22) Filed: Mar. 29, 2019

(65) Prior Publication Data

US 2020/0311198 A1   Oct. 1, 2020

(51) Int. Cl.
| | |
|---|---|
| *G06F 40/284* | (2020.01) |
| *G06N 20/20* | (2019.01) |
| *G06N 20/10* | (2019.01) |
| *G06F 40/205* | (2020.01) |
| *G06F 40/30* | (2020.01) |

(Continued)

(52) U.S. Cl.
CPC .......... *G06F 40/284* (2020.01); *G06F 40/205* (2020.01); *G06F 40/295* (2020.01); *G06F 40/30* (2020.01); *G06N 3/0454* (2013.01); *G06N 3/08* (2013.01); *G06N 20/10* (2019.01); *G06N 20/20* (2019.01)

(58) Field of Classification Search
CPC ............. G06F 17/30598; G06F 17/483; G06F 17/2785; G06F 17/271; G06F 17/279; G06F 16/3347; G06N 3/08; G06N 3/084
See application file for complete search history.

(56) References Cited

U.S. PATENT DOCUMENTS

| | | | |
|---|---|---|---|
| 9,477,654 B2* | 10/2016 | He | G06F 40/30 |
| 9,519,859 B2* | 12/2016 | Huang | G06F 16/951 |

(Continued)

OTHER PUBLICATIONS

Gupta, et al., "Neural Relation Extraction Within and Across Sentence Boundaries", In Journal of Computing Research Repository, Oct. 2018, 11 Pages.

(Continued)

*Primary Examiner* — Anne L Thomas-Homescu
(74) *Attorney, Agent, or Firm* — Alleman Hall Creasman & Tuttle LLP

(57) ABSTRACT

A computing system is provided. The computing system includes a processor configured to execute one or more programs and associated memory. The processor is configured to execute neural network system that includes a first neural network and a second neural network. The processor is configured to receive input text, and for each of a plurality of text spans within the input text: identify a vector of semantic entities and a vector of entity mentions; define an n-ary relation between entity mentions including subrelations; and determine mention-level representation vectors in the text spans that satisfy the n-ary relation or subrelations. The processor is configured to: aggregate the mention-level representation vectors over all of the text spans to produce entity-level representation vectors; input to the second neural network the entity-level representation vectors; and output a prediction of a presence of the n-ary relation for the semantic entities in the input text.

20 Claims, 5 Drawing Sheets

(51) Int. Cl.
*G06N 3/04* (2006.01)
*G06N 3/08* (2006.01)
*G06F 40/295* (2020.01)

(56) References Cited

U.S. PATENT DOCUMENTS

| | | | |
|---|---|---|---|
| 9,535,960 B2* | 1/2017 | Guo | G06N 3/0454 |
| 9,659,248 B1* | 5/2017 | Barbosa | G06N 3/0454 |
| 10,089,576 B2* | 10/2018 | Gao | G06F 16/9535 |
| 10,089,580 B2* | 10/2018 | Shan | G06N 3/08 |
| 10,133,729 B2* | 11/2018 | He | G06F 40/30 |
| 10,459,962 B1* | 10/2019 | Jayaraman | G06F 16/3329 |
| 10,599,774 B1* | 3/2020 | Luo | G06F 40/30 |
| 2017/0322923 A1* | 11/2017 | Dixon | G06N 3/0445 |
| 2018/0196873 A1* | 7/2018 | Yerebakan | G16H 10/60 |
| 2018/0336183 A1* | 11/2018 | Lee | G06F 40/30 |
| 2019/0065576 A1* | 2/2019 | Peng | G06F 16/22 |
| 2019/0278846 A1* | 9/2019 | Xiang | G06F 40/284 |
| 2020/0250264 A1* | 8/2020 | Bhide | G06F 40/289 |
| 2020/0293614 A1* | 9/2020 | Srivatsa | G06F 40/30 |
| 2020/0293873 A1* | 9/2020 | Dai | G06F 40/30 |
| 2020/0302018 A1* | 9/2020 | Turkkan | G06F 16/3347 |
| 2020/0320116 A1* | 10/2020 | Wu | G06N 5/02 |

OTHER PUBLICATIONS

Khirbat, et al., "N-ary Biographical Relation Extraction using Shortest Path Dependencies", In Proceedings of the Australasian Language Technology Association Workshop, Dec. 5, 2016, pp. 74-83.

Mandya, et al., "Combining Long Short Term Memory and Convolutional Neural Network for Cross-Sentence n-ary Relation Extraction", In Journal of Computing Research Repository, Nov. 2, 2018, 9 Pages.

Yao, et al., "Collective Cross-Document Relation Extraction Without Labelled Data", In Proceedings of Conference on Empirical Methods in Natural Language Processing, Oct. 9, 2010, 11 Pages.

Zhang et al., "End-to-End Neural Relation Extraction with Global Optimization", In Proceedings of Conference on Empirical Methods in Natural Language Processing, Sep. 7, 2017, pp. 1730-1740.

Zheng, et al., "An Effective Neural Model Extracting Document Level Chemical-Induced Disease Relations From Biomedical Literature", In Journal of Biomedical Informatics, vol. 83, Jul. 2018, pp. 1-9.

Zheng, et al., "Joint Entity and Relation Extraction Based on a Hybrid Neural Network", In Journal of Neurocomputing, vol. 257, Sep. 2017, pp. 1-8.

Jia, et al., "Document-Level N-ary Relation Extraction with Multiscale Representation Learning", In Journal of Computing Research Repository, Apr. 4, 2019, 12 Pages.

Lee, et al., "Deep Learning of Mutation-Gene-Drug Relations from the Literature", In Journal of BMC Bioinformatics, vol. 19, No. 1, Dec. 19, 2018, 13 Pages.

Mintz, et al., "Distant Supervision for Relation Extraction Without Labeled Data", In Proceedings of the Joint Conference of the 47th Annual Meeting of the ACL, Aug. 2, 2009, pp. 1003-1011.

"International Search Report and Written Opinion Issued in PCT Application No. PCT/US2020/016308", dated May 25, 2020, 11 Pages.

Peng, et al., "Cross-Sentence N-ary Relation Extraction with Graph LSTMs", In Journal of Computing Research Repository, Aug. 12, 2017, 15 Pages.

* cited by examiner

US 10,943,068 B2

N-ARY RELATION PREDICTION OVER TEXT SPANS

BACKGROUND

Extracting knowledge from written documents has increased in importance with the growing digitization of information. In research, tracking developments and grasping relevant information may be significant to both appropriately interpreting research results on a large scale and improving research and its applications. However, challenges exist to developing machine reading systems that can extract relationships between words, particularly in large documents.

SUMMARY

A computing system is provided. The system may include a processor and associated memory. The processor may be configured to execute a neural network system including at least a first neural network and a second neural network, the neural network system having been trained using a training data set. The processor may be further configured to receive input text and process the input text via the neural network system. For each of a plurality of text spans within the input text, the processor may be configured to: identify a vector of a plurality of semantic entities; identify a vector of entity mentions for each of the semantic entities; define an n-ary relation between entity mentions of the semantic entities, the n-ary relation having an associated plurality of subrelations; and determine one or more mention-level representation vectors in each of the plurality of text spans that satisfy at least one of the n-ary relation or subrelations for each of the semantic entities using the first neural network.

For the input text, including all of the text spans, the processor may be configured to: aggregate the mention-level representation vectors over all of the text spans to thereby produce entity-level representation vectors for the input text; input, to the second neural network, the entity-level representation vectors; and responsive to the input of the entity-level representation vectors, output from the second neural network a prediction of a presence of the n-ary relation for the semantic entities in the input text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Disclosed herein is a neural network system that utilizes a multiscale neural network architecture for document level n-ary relation prediction over a plurality of text spans. The neural network system may combine representations of entities, or word or text units, of interest learned over spans of text throughout a document, even over discontiguous sections of text. By extending relation extraction to an entire document, potential recall may be maximized. To address subsequent decreases in precision, a subrelation hierarchy may be integrated such that weak signals of the n-ary relation across a document may be recognized, as discussed below.

Execution of the neural network system may proceed with the input of word vectors and text segments or document sections that have been embedded. These inputs may be embodied as data structures that may include lists, vectors, tuples, and the like. For some example implementations given below, the use of vectors and specifically tuples will be described. As is known in the art, vectors and tuples may be treated as ordered lists. An ordered n-tuple may be considered as a set of n objects with an associated order. If n objects are represented by $x_1, x_2, \ldots x_n$, then the ordered n-tuple may be expressed as $(x_1, x_2, \ldots, x_n)$. A set of ordered n-tuples $(a_1, \ldots, a_n)$ may represent an n-ary relation on sets $A_1, \ldots, A_n$ where $a_i$ is an element of $A_i$ for all i, $1 \leq i \leq n$.

For the description below, $E_1, \ldots, E_n$ may represent entities such as nouns. For example, $E_1$ may be the drug talazoparib and $E_2$ may be the gene KRAS. Mentions of entities may be represented as $e_1, \ldots, e_n$. Following the given example, mentions of $E_1$ may include "Talazoparib", "BMN673", while mentions of $E_2$ may include "KRAS", "K-Ras", and so on. Mentions may be listed in a tuple $(e_1, \ldots, e_n)$. As is known in the art, to accomplish relation extraction documents may be searched to find instances of entity mentions for two or more entities within text spans, or discourse units, T Text span T may be, for example, a sentence or a paragraph. In the example above, a user may be interested in finding information about genes and drugs associated with gene mutations by extracting those relationships from a body of documents.

Relation extraction may involve classifying whether a relation R holds for $E_1, \ldots, E_n$ in T Although cases for mentions of entities for n=2 and T being a sentence may be understood in the art, for the current needs of knowledge acquisition from a body of documents it may be advantageous to have n>2 and with T being a sentence in a document D of hundreds of sentences. The inventors have recognized that an entity-centric formulation, as opposed to a mention-focused approach, may be implemented to meet this level of relation extraction.

Figure 1:
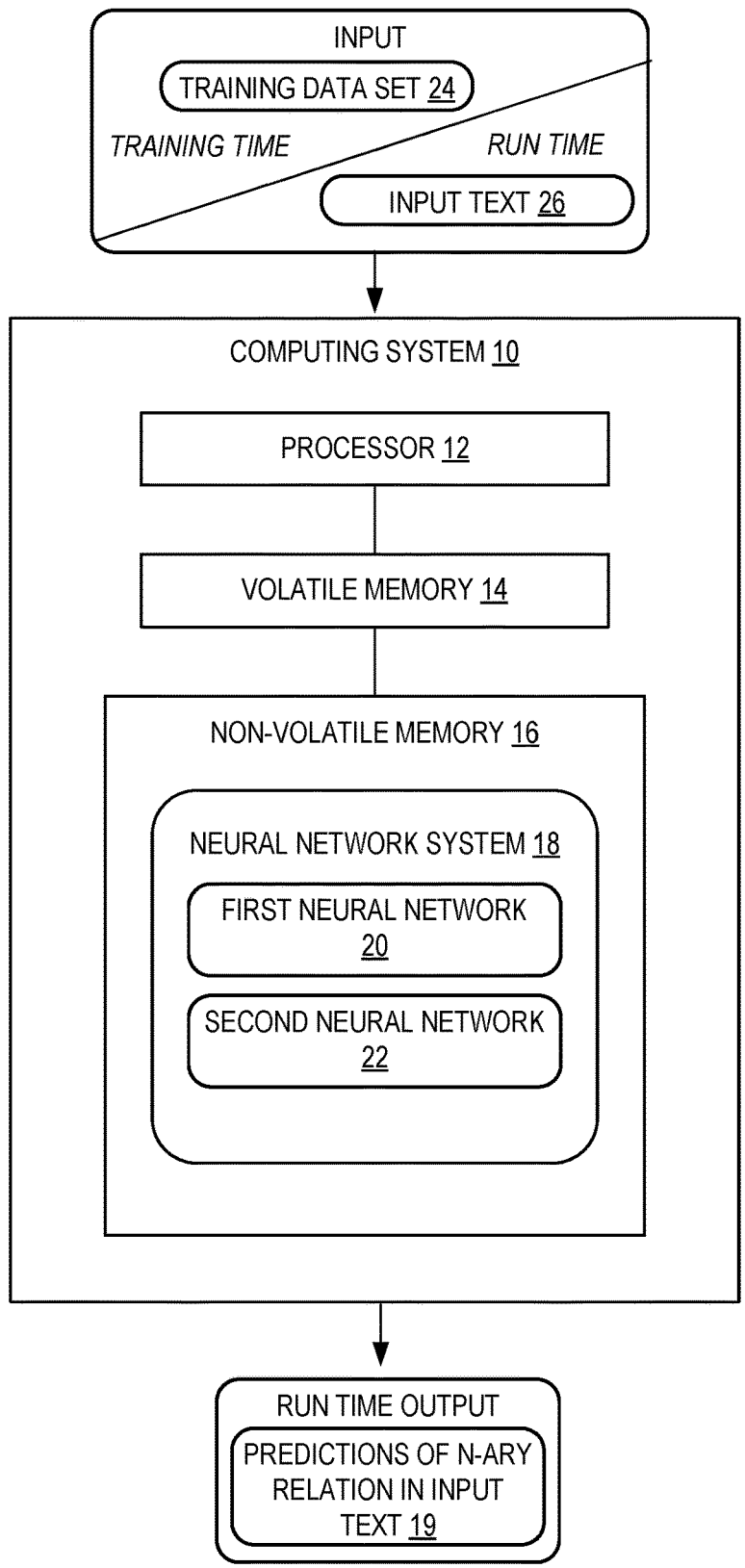
FIG. 1 shows a computing system according to an example implementation of the present disclosure.

FIG. 1 shows a computing system 10 according to an example implementation of the present disclosure. The computing system 10 may include a processor 12 and associated memory, which in FIG. 1 is depicted as volatile memory 14 and non-volatile memory 16. The processor 12 may be configured to execute one or more programs stored in the memory to execute neural network system 18 that has a multiscale neural network system. Thus, the neural network system 18 may include at least a first neural network 20 and a second neural network 22. The neural network system 18 may have been trained using a training data set 24, which will be discussed in further detail below. After training, at run time, the processor 12 may be further configured to receive input text 26, for processing via the neural network system 18. As a result of processing the input text, the neural network system 18 may be configured to produce an output of predictions 19 of n-ary relations in the input text, as discussed below.

At run time, the neural network system 18 may receive, as input, a plurality of text spans T It will be appreciated that the text spans T may be sentences, may be shorter than a sentence, or may be longer than a sentence such as for a text span T that is a paragraph, section, chapter, and so forth. In addition, the plurality of text spans T may include text spans T at a plurality of scales, including one or more of sentence and paragraph. The text spans T may also be discontiguous. Although the neural network system 18 may be developed to extract a relation R over an entire document D, one potential advantage may be that the text spans T need not be in continuous order. The input text 26 may also include an entire document D having a plurality of paragraphs. As described above, known relation extraction protocol may suffer from decreases in precision when operating over larger bodies of text and a plurality of text spans T. One advantage of the computing system 10 may be to not only receive larger bodies of text such as documents, but to counter decreases in precision with increased sensitivity to weak signals of an n-ary relation by a novel incorporation of subrelation hierarchy as described below.

For each of a plurality of text spans T within the input text 26, the processor 12 may be configured to identify a vector of a plurality of semantic entities $E_i$. A tuple of entities may be expressed as $(E_1, \ldots, E_n)$. Given each text span T, there may be mentions of entities from the tuple $(E_1, \ldots, E_n)$ within T, such that for each $E_i$ there may be a variable number of entity mentions $e_i$ in T The processor 12 may be configured to define an n-ary relation R between entity mentions $e_i$ of the semantic entities, the n-ary relation R having an associated plurality of subrelations. To classify R over the semantic entities $E_i$, all possible combinations of $(e_1, \ldots, e_n)$ are considered. For entities $(E_1, \ldots, E_n)$, an n-ary relation candidate may be an (n+1)-tuple $(E_1, \ldots, E_n, T)$ where each entity $E_i$ may be mentioned at least once in text span T For larger n, entity mention tuples may be less likely to be completely contained within one text span T The relation R may thus be decomposed into subrelations, each of which may be more likely to be expressed in one given text span T. $R_S$ may be the |S|-ary subrelation over entities $E_{S1}, \ldots, E_{S|S|}$ where $S \subseteq \{1, \ldots, n\}$ and |S| denotes the size of the subrelation $R_S$.

To give an example that will be expanded below, $E_1$ may be a gene, $E_2$ a gene mutation, and $E_3$ a drug that may be associated with the gene mutation, the relationship between which may be of interest to biomedical researchers and for which there may be a plurality of associated mentions $e_i$ respectively. Text spans T may be paragraphs in published research documents D that may contain mentions of the genes, mutations, and/or drugs. In order to extract the relationship between a given gene, mutation, and drug via machine reading, a plurality of documents D may be searched. Some documents may have no mention of any of the entities, or may mention an entity in isolation. However, for documents D that include entity mentions of one or more particular genes, one or more particular mutations, and/or one or more particular drugs, it may be desired that a resulting machine reading search accurately determine whether a significant relationship exists in the document D for any particular ternary tuple of gene, mutation, and drug. Thus, in addition to the presence of a ternary (3-ary) relation between their entity mentions in any text span Tin the document D, binary (2-ary) subrelations such as gene-mutation, gene-drug, and drug-mutation (regardless of order) that may appear in text spans T may also be considered to determine whether the overall document D in its entirety includes the presence of a significant relationship between the particular gene, mutation, drug entities.

Figure 2:
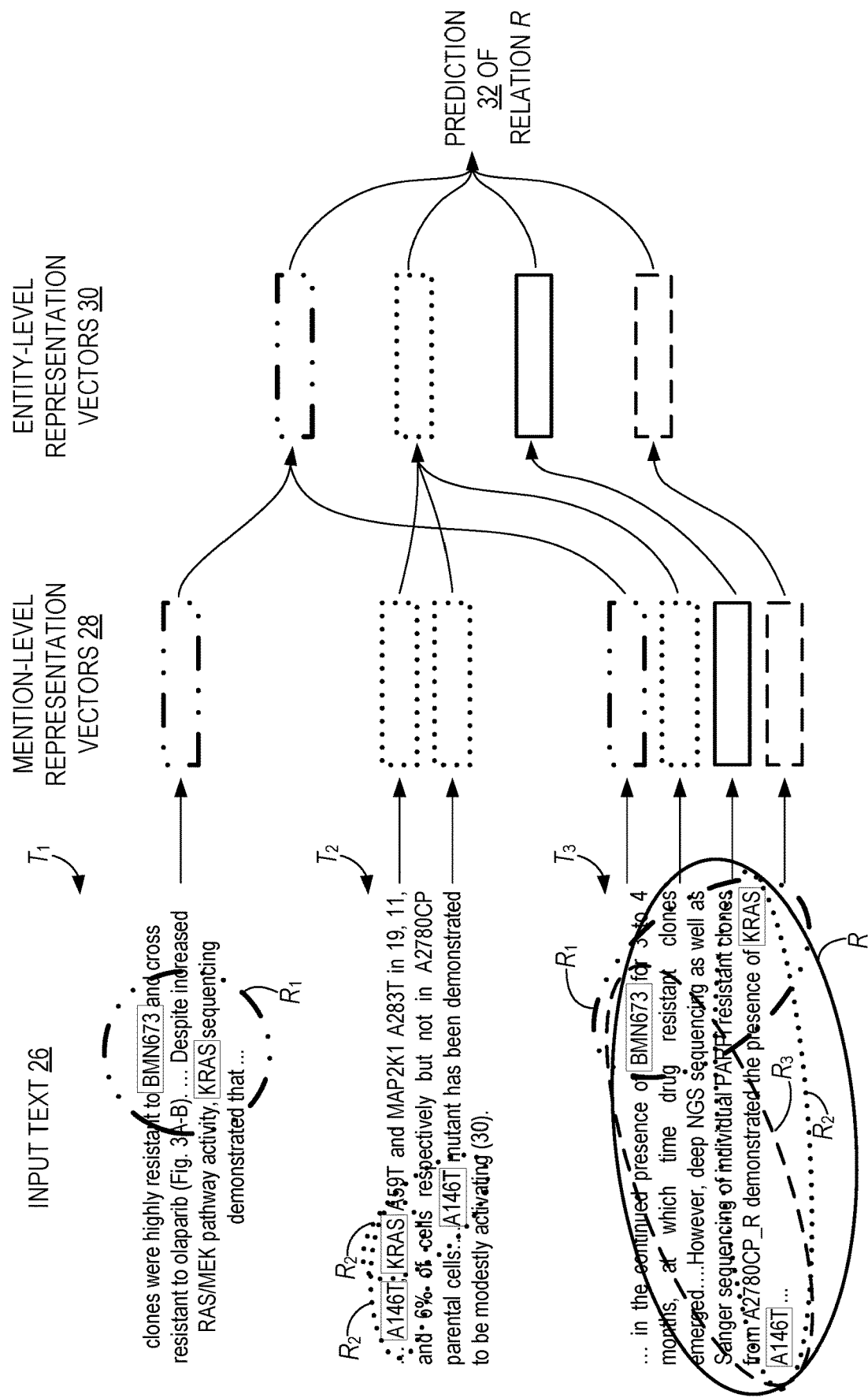
FIG. 2 is a schematic showing processing from input text to prediction according to one example implementation of the computing system of FIG. 1.

FIG. 2 is a schematic showing a flow chart for processing from input text 26 to prediction 32 of a relation R according to one example implementation of the computing system 10. At the left end of FIG. 2, input text 26 is shown. In this example, a relation R between a gene, gene mutation, and drug is searched. The gene has the canonical name of "KRAS", but is also known as "C-K-RAS", for example, among other entity mentions $e_i$. It will be appreciated that "C-K-RAS" is a second entity mention that, while not appearing in the text in FIG. 2, may appear in other text spans in D and thus would be included with KRAS in an entity mention tuple $(e_1, \ldots, e_n)$. The gene mutation of interest is A146T; thus, the search includes entity mention A146T as well as other references such as the CDS mutation c.436G>A. $A_n$ entity mention tuple for drugs in this example may include BMN673 and talazoparib, two names for the same drug, among other names the drug may have. In FIG. 2, where three text spans T of input text 26 are shown, mentions of BMN673, KRAS, and A146T occur. In the first text span $T_1$, a subrelation $R_1$ of entities drug and gene occur. In the second text span $T_2$, two subrelations $R_2$ occur, both between entity mention KRAS and entity mention A146T. In the third text span $T_3$, the three subrelations $R_1$, $R_2$ and $R_3$ occur, one being drug-gene, one being gene-mutation, and one being drug-mutation. Also extracted from text span $T_3$ is the full ternary relation R of drug-gene-mutation, as shown in FIG. 2.

The processor 12 may be configured to determine one or more mention-level representation vectors 28 in each of the plurality of text spans T that satisfy at least one of the n-ary relation R or subrelations $R_S$ for each of the semantic entities $E_i$ using the first neural network 20. Mention-level representation vectors 28 for $R_S$ may be constructed as $r(R_S, e_{S1}, \ldots, e_{S|S|}, T)$. In FIG. 2, this step is depicted as going to the right of the input text 26 to the mention-level representation vectors 28.

For the input text 26, including all of the text spans T, the processor 12 may be configured to aggregate the mention-level representation vectors 28 over all of the text spans T to thereby produce entity-level representation vectors 30 for the input text 26. Given document D, entity-level representation vectors 30 $r(R, E_1, \ldots, E_n, D)$ may be created by combining mention-level representation vectors 28 using an aggregation operator C such that $$C_{(e_1,\ldots,e_n,T) \in M_D}(r(R, e_1, \ldots, e_n, T))$$

where $M_D$ is the set of mention tuples and their corresponding text spans T in the document D. In terms of including subrelations $R_S$, from mention-level representation vectors 28 for subrelations $R_S$ constructed as $r(R_S, e_{S1}, \ldots, e_{S|S|}, T)$, entity-level representation vectors 30 may be constructed as $r(R_S, E_{S1}, \ldots, E_{S|S|}, D)$. These vectors may be composed using the chosen aggregation operator C which may be, for example, max pooling. It will be appreciated that aggregating may include an aggregation operator C performing an operation that includes at least one of max pooling, max pooling with smoothing, and ensemble prediction. Ensemble prediction may include, for example, outputting individual predictions for text spans T before aggregating to a final prediction 32. In FIG. 2, this step is represented going to the right from the mention-level representation vectors 28 to the entity-level representation vectors 30.

The processor 12 may be configured to input, to the second neural network 22, the entity-level representation vectors 30. Responsive to the input of the entity-level representation vectors 30, the processor 12 may be configured to output from the second neural network 22 a prediction 32 of a presence of the n-ary relation R for the semantic entities $E_i$ in the input text 26. The processor 12 may also be configured to concatenate the entity-level representation vectors for each subrelation $R_S$ before inputting to the second neural network 22 to output the prediction 32. The final prediction 32 may be formed by first concatenating entity-level representations $r(R_S, E_{S1}, \ldots, E_{S|S|}, D)$ for all $S \subseteq \{1, \ldots, n\}$ of size at least 2 (including the whole set, which corresponds to the full relation R). In one example implementation, the resulting vector may be fed through a two-layer feedforward neural network that may be the second neural network 22 followed by a softmax function to predict the relation R. The prediction 32 may be an indicator of a probability of each of the n-ary relations R being mapped to the semantic entities $E_i$ within the input text 26. Following the gene-mutation-drug example from above, the prediction 32 may indicate that, although there are entity mentions $e_i$ within the document D, the document D as a whole may not include a relation R between the entities $E_i$. Alternatively, the prediction 32 may indicate that a document D is likely to contain a relation R between, in the case of the input text 26 of FIG. 2, the gene KRAS, the gene mutation A146T, and the drug BMN673. One potential advantage of this configuration may be that, over a plurality of documents D, the computing system 10 may predict a plurality of relations R between the gene, gene mutation, and drug even though each entity $E_i$ may be present in the various documents D under different entity mentions $e_i$.

Figure 3:
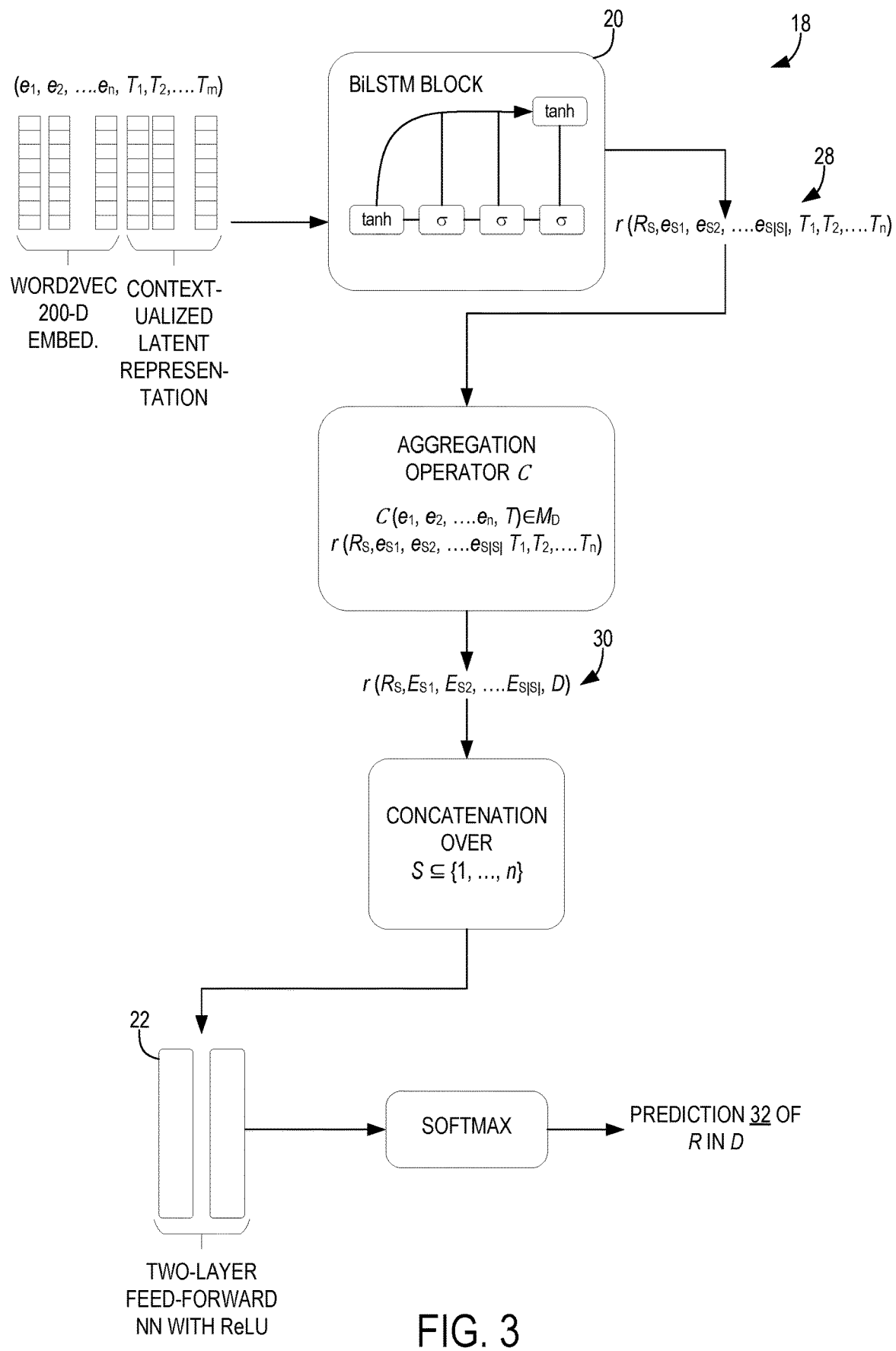
FIG. 3 is an example implementation of the computing system of FIG. 1.

FIG. 3 is an example implementation of the computing system of FIG. 1 showing one example implementation of neural network system 18 having a multiscale neural network architecture for n-ary relation prediction that includes subrelations $R_S$ over text spans T for a document D. A representation of entity mention tuple $(e_1, \ldots, e_n)$ and a plurality of text spans $(T_1, \ldots, T_m)$ may be input to neural network system 18. Entity mention tuples $(e_1, \ldots, e_n)$, which may be constructed for words or other units of text, may be initialized and embedded with the word2vec model. Following the gene-mutation-drug example from above, in one implementation the word2vec model may be employed to generate 200-dimensional word vectors trained on a body of biomedical texts, and the text spans T may be prepared for input with, for example, a contextualized latent representation that may be a 100-dimensional embedding. In the example implementation of FIG. 3, the first neural network 20 may include a bidirectional long short term memory neural network (BiLSTM), which is a specific type of recurrent neural network (RNN), capable of learning long-term dependencies. The BiLSTM may be included with a single-layer neural network. The BiLSTM may receive a concatenation of the word vectors and embedded text spans T The single-layer BiLSTM may have, for example, a 200-dimensional hidden state, followed by a single layer and a tan h activation function to produce 400-dimensional mention-level representation vectors 28.

With output of the mention-level representation vectors 28 from the BiLSTM, an aggregation operator C of choice may be applied. Following the flow chart of FIG. 3, the resulting entity-level representation vectors 30 may be concatenated as described above. To generate the prediction 32 of the n-ary relations R, the concatenated vectors may be input to the second neural network 22 which may include, as in the example of FIG. 3, a two-layer feedforward network. The two-layer feedforward network may include, for example, 400 hidden units and rectified linear units (ReLU) as an activation function. A softmax function, for example, may follow the second neural network 22 to output the relation R.

It will be appreciated that the neural network system 18 may be trained at training time before receiving input text 26 for n-ary relation extraction at run time. Training the neural network system 18 may include at least one of supervised training and distant supervision training. In cases of research areas where output is high, a suitable and sufficient tracking of results may not meet the output rate. As such, it may not be possible to train neural network system under supervised training with a large set of known relationships. In such a case, distant supervision training may be implemented, where not all data may be labeled. One potential advantage to this configuration may be that distant supervision at the entity level may be less noisy compared to the mention level. As such, denoising strategies may not be as critical to training. In one example implementation, training may include an Adam optimizer with, for example, a learning rate of $1 \times 10^{-5}$.

In a gene-mutation-drug example for human medical research, the training data set 24 may include, for example, missense mutations extracted from PubMed Central Open Access Subset documents, gene mentions from the HUGO Gene Nomenclature Committee, and/or lists of drugs from appropriate databases such as DrugBank. Text documents may be obtained from open access repositories and then tokenized. Regular expressions and dictionary lookups may be employed to extract the entity mentions $E_i$. The processor 12 may be configured to test the neural network system 18. Testing may include outputting a test prediction for each text span T and combining the test predictions over the plurality of text spans T using an ensemble operator to generate a document-level prediction for the input text 26.

Identifying the vector of entity mentions $(e_1, \ldots, e_n)$ may include, at a pre-processing stage, the processor 12 being configured to generate a mapping of a first entity mention to a second entity mention from tokenizing a document dataset and applying of at least one of a set of rules. The example given below illustrates one implementation by which a mapped relationship between entity mentions $e_i$ and semantic entities $E_i$ may be established during preprocessing. It may be that a global mapping of the entity mentions $e_i$ of one semantic entity $E_i$ to the entity mentions $e_i$ of a second semantic entity $E_i$ is useful. In the case of genes and gene mutations, public access datasets may be sourced to determine the mapping. In addition, rules may be applied to tokenized text sources to determine a gene most often occurring with a particular gene mutation. These rules may include, for example, that the first entity mention and the second entity mention are in a same token, or in the given example determining which gene and gene mutation are present in the same token. Additional rules may include determining that a specific gene mutation token follows a gene token, and determining that a gene token is followed by a single character that is then followed by a gene mutation token. Each rule may be sequentially applied, where subsequently the gene occurring in the most matches may be added to the global mapping.

Figure 4:
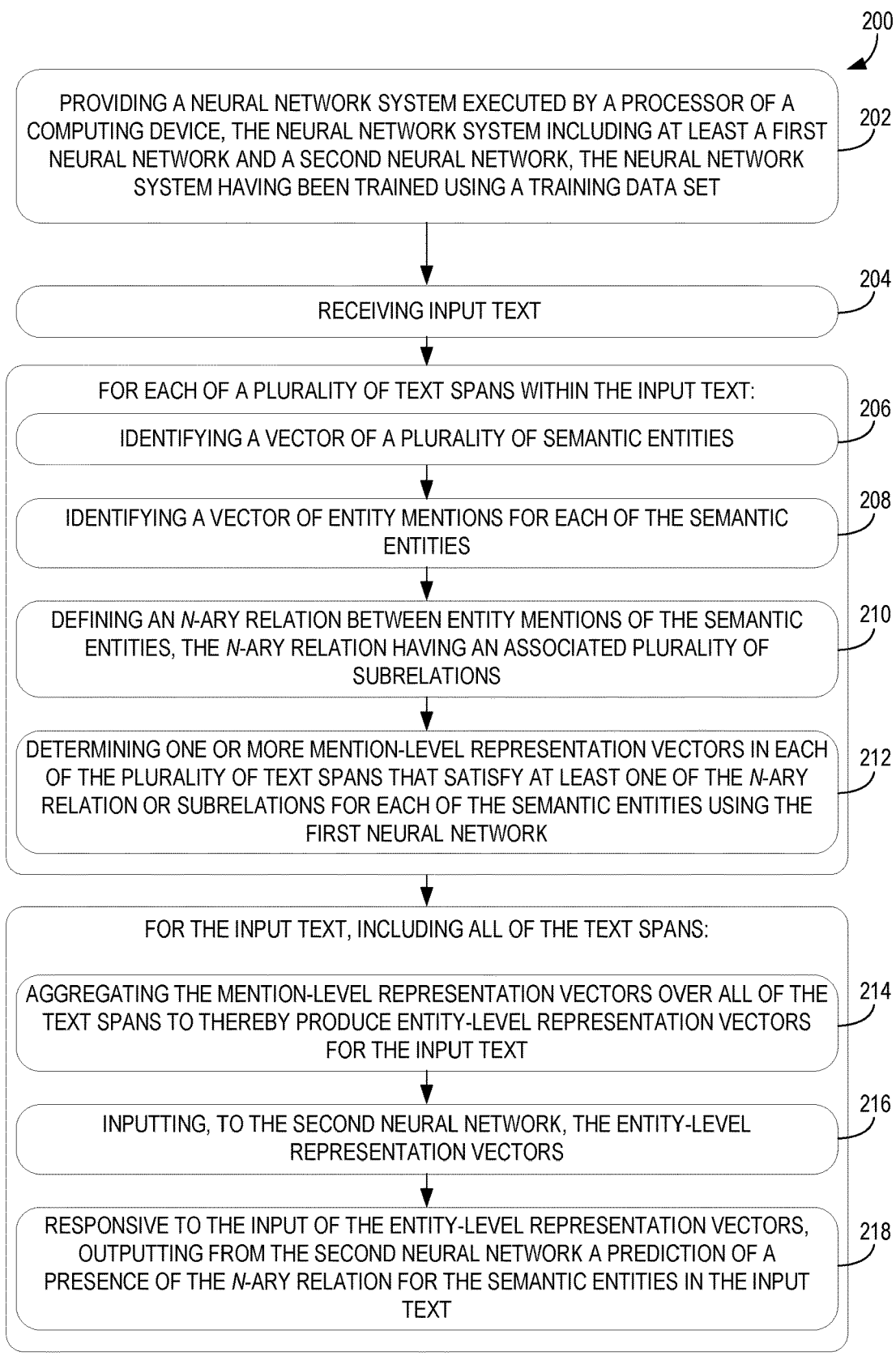
FIG. 4 is a flowchart of a method according to one implementation of the present disclosure.

FIG. 4 shows a flowchart of a method 200 for use with a computing device of the computing system 10. The following description of method 200 is provided with reference to the computing systems 10 described above and shown in FIG. 1. It will be appreciated that method 200 may also be performed in other contexts using other suitable components.

With reference to FIG. 4, the method 200 may be for use with a computing device. The method 200 at 202 may include providing neural network system 18 executed by the processor of the computing device, the neural network system 18 including at least a first neural network 20 and a second neural network 22, the neural network system 18 having been trained using a training data set 24.

The following steps may be executed at the processor 12 of the computing device. At 204, the method 200 may include receiving input text 26. The method 200 may further include processing the input text using the neural network system provided at 202. The processing may be accomplished as follows. For each of a plurality of text spans T within the input text 26, the method 200 may include: at 206, identifying a vector of a plurality of semantic entities $E_i$; at 208, identifying a vector of entity mentions $e_i$ for each of the semantic entities $E_i$; at 210, defining an n-ary relation R between entity mentions $e_i$ of the semantic entities $E_i$, the n-ary relation R having an associated plurality of subrelations $R_S$; and at 212, determining one or more mention-level representation vectors 28 in each of the plurality of text spans T that satisfy at least one of the n-ary relation R or subrelations $R_S$ for each of the semantic entities $E_i$ using the first neural network 20. As described above, for entities $(E_1, \ldots, E_n)$ and entity mentions $(e_1, \ldots, e_n)$ an n-ary relation candidate may be an (n+1)-tuple $(E_1, \ldots, E_n, T)$ where each entity $E_i$ may be mentioned at least once in text span T. $R_S$ may be the |S|-ary subrelation over entities $E_{S1}, \ldots, E_{S|S|}$ where $S \subseteq \{1, \ldots, n\}$ and |S| denotes the size of the subrelation $R_S$.

For the input text 26, including all of the text spans T, the method 200 may include: at 214, aggregating the mention-level representation vectors 28 over all of the text spans T to thereby produce entity-level representation vectors 30 for the input text 26; at 216, inputting, to the second neural network 22, the entity-level representation vectors 30; and at 218, responsive to the input of the entity-level representation vectors 30, outputting from the second neural network 22 a prediction of a presence of the n-ary relation R for the semantic entities $E_i$ in the input text 26. The mention-level representation vector 28 may be expressed in some implementations as $r(R_S, e_{S1}, \ldots, e_{S|S|}, T)$; the entity-level representation vector 30 may be expressed as $r(R_S, E_{S1}, \ldots, E_{S|S|}, D)$.

As discussed above, the text spans T may be sentences, may be shorter than a sentence, or may be longer than a sentence such as for a text span T that is a paragraph, section, chapter, and so forth. In addition, the plurality of text spans T may include text spans T at a plurality of scales, including one or more of sentence and paragraph. The text spans T may also be discontiguous. The input text 26 may also include an entire document D having a plurality of paragraphs.

As also discussed above, the first neural network 20 may include a BiLSTM RNN with a single-layer neural network. Aggregating the mention-level representation vectors 28 may include an aggregation operator C performing an operation that includes at least one of max pooling, max pooling with smoothing, and ensemble prediction. Producing entity-level representation vectors 30 from aggregation may be followed by, at the processor 12, the entity-level representation vectors 30 being concatenated for each subrelation $R_S$ before inputting to the second neural network 22 to output the prediction 32. The second neural network 22 may include a two-layer feedforward neural network. The prediction 32 may be an indicator of a probability of each of the n-ary relations R being mapped to the semantic entities $E_i$ within the input text 26. Prediction 32 may indicate that, although there are entity mentions $e_i$ within the document D, the document D as a whole may not include a relation R between the entities $E_i$. Alternatively, the prediction 32 may indicate that a document D is likely to contain a relation R between entities $E_i$ determined from the presence of two or more entity mentions $e_i$.

Training the neural network system 18 may include at least one of supervised training and distant supervision training, as described above. At the processor 12, the neural network system 18 may be tested. Testing may include outputting a test prediction for each text span T and combining the test predictions over the plurality of text spans T using an ensemble operator to generate a document-level prediction 32 for the input text 26. At a pre-processing stage, identifying the vector of entity mentions $e_i$ may include, at the processor 12, generating a mapping of a first entity mention to a second entity mention from tokenizing a document dataset and applying of at least one of a set of rules. The set of rules may include, for example, at least a first predetermined rule that the first entity mention and the second entity mention are in a same token.

In the examples and implementations given above, document-level n-ary relation prediction for relations R is demonstrated for a computing system 10 that may include a subrelation hierarchy to sensitize the computing system 10 to weaker signals of a relation R. Recall and precision, therefore, may be improved. The neural network system 18 may receive text spans T of various lengths that may even be discontiguous. Given the computing system 10, knowledge acquisition may, therefore, be expedited from increasingly expanding stores of research and information that may otherwise be challenging to process.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
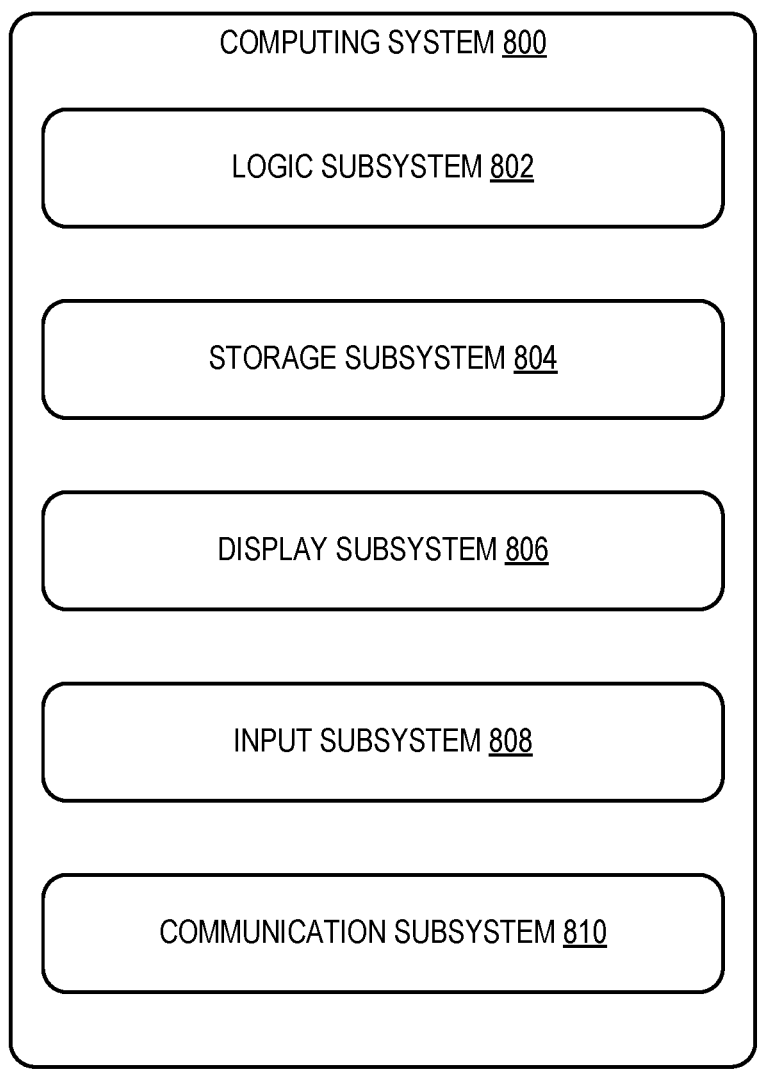
FIG. 5 is an example computing environment, which may be used to implement the computing system of FIG. 1.

FIG. 5 schematically shows a simplified representation of a computing system 800 configured to provide any to all of the compute functionality described herein. Computing system 800 may take the form of one or more virtual/augmented/mixed reality computing devices, personal computers, network-accessible server computers, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 5.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 806 may be used to present a visual representation of data held by storage subsystem 804. This visual representation may take the form of a graphical user interface (GUI) including holographic virtual objects. Display subsystem 806 may include one or more display devices utilizing virtually any type of technology. In some implementations, display subsystem 806 may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a computing system comprising a processor and associated memory, the processor being configured to execute one or more programs stored in the memory to receive an input text and process the input text using a neural network system, the neural network system including at least a first neural network and a second neural network, the neural network system having been trained using a training data set. To process the input text, the processor is configured to, for each of a plurality of text spans within the input text: identify a vector of a plurality of semantic entities; identify a vector of entity mentions for each of the semantic entities; define an n-ary relation between entity mentions of the semantic entities, the n-ary relation having an associated plurality of subrelations; and determine one or more mention-level representation vectors in each of the plurality of text spans that satisfy at least one of the n-ary relation or subrelations for each of the semantic entities using the first neural network. To process the input text, the processor is further configured to, for the input text, including all of the text spans: aggregate the mention-level representation vectors over all of the text spans to thereby produce entity-level representation vectors for the input text; input, to the second neural network, the entity-level representation vectors; and responsive to the input of the entity-level representation vectors, output from the second neural network a prediction of a presence of the n-ary relation for the semantic entities in the input text.

In this aspect, additionally or alternatively, the text spans may be discontiguous. In this aspect, additionally or alternatively, the text spans may be longer than a sentence. In this aspect, additionally or alternatively, the plurality of text spans may include text spans at a plurality of scales including one or more of sentence and paragraph. In this aspect, additionally or alternatively, the input text may include an entire document having a plurality of paragraphs.

In this aspect, additionally or alternatively, the processor may be configured to concatenate the entity-level representation vectors for each subrelation before inputting to the second neural network to output the prediction. In this aspect, additionally or alternatively, the prediction may be an indicator of a probability of each of the n-ary relations being mapped to the semantic entities within the input text. In this aspect, additionally or alternatively, aggregating may include an aggregation operator performing an operation that may include at least one of max pooling, max pooling with smoothing, and ensemble prediction.

In this aspect, additionally or alternatively, the first neural network may include a bidirectional long short-term memory recurrent neural network with a single-layer neural network, and the second neural network may include a two-layer feedforward neural network. In this aspect, additionally or alternatively, training the neural network system may include at least one of supervised training and distant supervision training. In this aspect, additionally or alternatively, the processor may be configured to test the neural network system, wherein testing may include outputting a test prediction for each text span and combining the test predictions over the plurality of text spans using an ensemble operator to generate a document-level prediction for the input text.

In this aspect, additionally or alternatively, identifying the vector of entity mentions may include, at a pre-processing stage, the processor being configured to generate a mapping of a first entity mention to a second entity mention from tokenizing a document dataset and applying of at least one of a set of rules. The set of rules may include at least a first predetermined rule that the first entity mention and the second entity mention are in a same token.

Another aspect provides a method for use with a computing device including a processor, comprising receiving input text at the computing device and processing the input text using a neural network system executed via the processor of the computing device, the neural network system including at least a first neural network and a second neural network, the neural network system having been trained using a training data set. The processing includes, for each of a plurality of text spans within the input text: identifying a vector of a plurality of semantic entities; identifying a vector of entity mentions for each of the semantic entities; defining an n-ary relation between entity mentions of the semantic entities, the n-ary relation having an associated plurality of subrelations; and determining one or more mention-level representation vectors in each of the plurality of text spans that satisfy at least one of the n-ary relation or subrelations for each of the semantic entities using the first neural network. The processing further includes, for the input text, including all of the text spans: aggregating the mention-level representation vectors over all of the text spans to thereby produce entity-level representation vectors for the input text; inputting, to the second neural network, the entity-level representation vectors; and responsive to the input of the entity-level representation vectors, outputting from the second neural network a prediction of a presence of the n-ary relation for the semantic entities in the input text.

In this aspect, additionally or alternatively, the text spans may be discontiguous. In this aspect, additionally or alternatively, the text spans may be longer than a sentence. In this aspect, additionally or alternatively, the plurality of text spans may include text spans at a plurality of scales including one or more of sentence and paragraph. In this aspect, additionally or alternatively, the input text may include an entire document having a plurality of paragraphs. In this aspect, additionally or alternatively, the method may further comprise, at the processor, concatenating the entity-level representation vectors for each subrelation before inputting to the second neural network to output the prediction. In this aspect, additionally or alternatively, the prediction may be an indicator of a probability of each of the n-ary relations being mapped to the semantic entities within the input text.

Another aspect provides a method for use with a computing device including a processor, comprising: providing a neural network system executed by the processor of the computing device, the neural network system including at least a first neural network that is a bidirectional long short-term memory recurrent neural network with a single-layer neural network, and a second neural network that is a two-layer feedforward neural network, the neural network system having been trained using a training data set; and receiving input text. The method further comprises, for each of a plurality of text spans within the input text: identifying vector of a plurality of semantic entities; identifying a vector of entity mentions for each of the semantic entities; defining an n-ary relation between entity mentions of the semantic entities, the n-ary relation having an associated plurality of subrelations; and determining one or more mention-level representation vectors in the text span that satisfy at least one of the n-ary relation or subrelations for each of the semantic entities in each of the plurality of text spans using the first neural network. The method further comprises, for the input text, including all of the text spans: aggregating the mention-level representation vectors over all of the text spans to thereby produce entity-level representation vectors for the input text; inputting, to the second neural network, the entity-level representation vectors; and, responsive to the input of the entity-level representation vectors, outputting from the second neural network a prediction of a presence of the n-ary relation for the semantic entities in the input text. The text spans are discontiguous.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
 a processor and associated memory, the processor being configured to execute one or more programs stored in the memory to:
 receive an input text;
 process the input text using a neural network system, the neural network system including at least a first neural network and a second neural network, the neural network system having been trained using a training data set;
 wherein to process the input text, the processor is configured to, for each of a plurality of text spans within the input text:
 identify a vector of a plurality of semantic entities;
 identify a vector of entity mentions for each of the semantic entities;
 define an n-ary relation between entity mentions of the semantic entities, the n-ary relation having an associated plurality of subrelations;
 determine one or more mention-level representation vectors in each of the plurality of text spans that satisfy at least one of the n-ary relation or subrelations for each of the semantic entities using the first neural network;

wherein to process the input text, the processor is further configured to, for the input text, including all of the text spans:
aggregate the mention-level representation vectors over all of the text spans to thereby produce entity-level representation vectors for the input text;
input, to the second neural network, the entity-level representation vectors; and
responsive to the input of the entity-level representation vectors, output from the second neural network a prediction of a presence of the n-ary relation for the semantic entities in the input text.

2. The system of claim 1, wherein the text spans are discontiguous.

3. The system of claim 1, wherein the text spans are longer than a sentence.

4. The system of claim 1, wherein the plurality of text spans includes text spans at a plurality of scales including one or more of sentence and paragraph.

5. The system of claim 1, wherein the input text includes an entire document having a plurality of paragraphs.

6. The system of claim 1, further comprising the processor being configured to concatenate the entity-level representation vectors for each subrelation before inputting to the second neural network to output the prediction.

7. The system of claim 1, wherein the prediction is an indicator of a probability of each of the n-ary relations being mapped to the semantic entities within the input text.

8. The system of claim 1, wherein aggregating includes an aggregation operator performing an operation that includes at least one of max pooling, max pooling with smoothing, and ensemble prediction.

9. The system of claim 1, wherein the first neural network includes a bidirectional long short-term memory recurrent neural network with a single-layer neural network, and the second neural network includes a two-layer feedforward neural network.

10. The system of claim 1, wherein training the neural network system includes at least one of supervised training and distant supervision training.

11. The system of claim 1, further comprising the processor being configured to test the neural network system, wherein testing includes outputting a test prediction for each text span and combining the test predictions over the plurality of text spans using an ensemble operator to generate a document-level prediction for the input text.

12. The system of claim 1, wherein identifying the vector of entity mentions includes, at a pre-processing stage, the processor being configured to generate a mapping of a first entity mention to a second entity mention from tokenizing a document dataset and applying of at least one of a set of rules, the set of rules including at least a first predetermined rule that the first entity mention and the second entity mention are in a same token.

13. A method for use with a computing device including a processor, comprising:
receiving input text at the computing device;
processing the input text using a neural network system executed via the processor of the computing device, the neural network system including at least a first neural network and a second neural network, the neural network system having been trained using a training data set;
wherein the processing includes, for each of a plurality of text spans within the input text:
identifying a vector of a plurality of semantic entities;
identifying a vector of entity mentions for each of the semantic entities;
defining an n-ary relation between entity mentions of the semantic entities, the n-ary relation having an associated plurality of subrelations;
determining one or more mention-level representation vectors in each of the plurality of text spans that satisfy at least one of the n-ary relation or subrelations for each of the semantic entities using the first neural network;
wherein the processing further includes, for the input text, including all of the text spans:
aggregating the mention-level representation vectors over all of the text spans to thereby produce entity-level representation vectors for the input text;
inputting, to the second neural network, the entity-level representation vectors; and
responsive to the input of the entity-level representation vectors, outputting from the second neural network a prediction of a presence of the n-ary relation for the semantic entities in the input text.

14. The method of claim 13, wherein the text spans are discontiguous.

15. The method of claim 13, wherein the text spans are longer than a sentence.

16. The method of claim 13, wherein the plurality of text spans includes text spans at a plurality of scales including one or more of sentence and paragraph.

17. The method of claim 13, wherein the input text includes an entire document having a plurality of paragraphs.

18. The method of claim 13, further comprising, at the processor, concatenating the entity-level representation vectors for each subrelation before inputting to the second neural network to output the prediction.

19. The method of claim 13, wherein the prediction is an indicator of a probability of each of the n-ary relations being mapped to the semantic entities within the input text.

20. A method for use with a computing device including a processor, comprising:
providing a neural network system executed by the processor of the computing device, the neural network system including at least a first neural network that is a bidirectional long short-term memory recurrent neural network with a single-layer neural network, and a second neural network that is a two-layer feedforward neural network, the neural network system having been trained using a training data set;
receiving input text;
for each of a plurality of text spans within the input text;
identifying a vector of a plurality of semantic entities;
identifying a vector of entity mentions for each of the semantic entities;
defining an n-ary relation between entity mentions of the semantic entities, the n-ary relation having an associated plurality of subrelations;
determining one or more mention-level representation vectors in the text span that satisfy at least one of the n-ary relation or subrelations for each of the semantic entities in each of the plurality of text spans using the first neural network;
for the input text, including all of the text spans;
aggregating the mention-level representation vectors over all of the text spans to thereby produce entity-level representation vectors for the input text;

inputting, to the second neural network, the entity-level representation vectors; and responsive to the input of the entity-level representation vectors, outputting from the second neural network a prediction of a presence of the n-ary relation for the semantic entities in the input text, wherein the text spans are discontiguous.

* * * * *